March 26, 1940.   R. M. CRITCHFIELD ET AL   2,194,885
PROTECTOR
Filed April 15, 1937
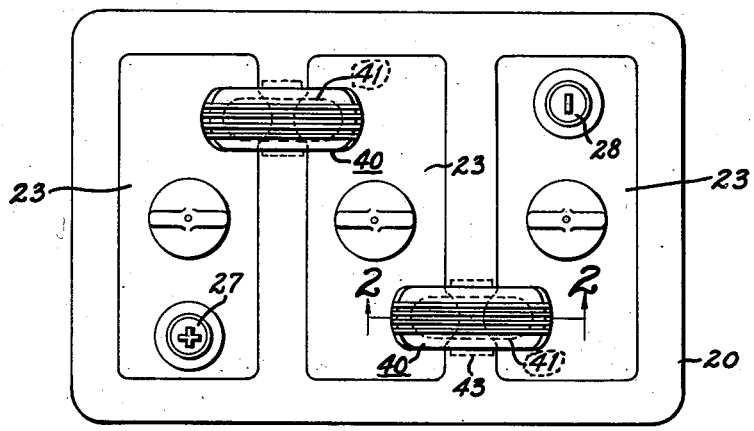
Fig.1
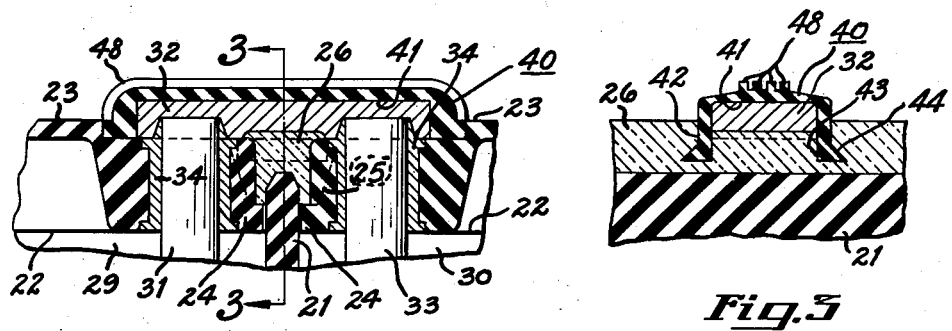
Fig.2
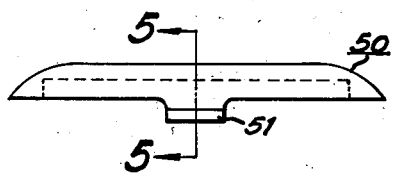
Fig.4
Fig.5
Fig.3
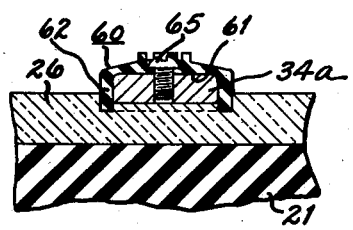
Fig.6
Inventors
Robert M. Critchfield
Arthur G. Phelps
By Spencer, Hardman & Fehr
Their Attorneys Patented Mar. 26, 1940

2,194,885

UNITED STATES PATENT OFFICE 2,194,885

PROTECTOR

Robert M. Critchfield and Arthur G. Phelps, Anderson, Ind., assignors to General Motors Corporation, Detroit, Mich., a corporation of Delaware Application April 15, 1937, Serial No. 137,032

8 Claims. (Cl. 136—134)

This invention relates to covers or protectors for batteries, and more particularly to covers which are adapted to fit over the lead links or bars joining the negative electrode of one cell with the positive of another.

An object of the present invention is to provide a cover that will improve the top appearance of a storage battery.

Another object of the invention is to provide a novel shield or cover for the connecting links which will efficiently prevent short circuiting of cells, due to foreign objects falling on the top of the battery.

Further objects and advantages of the present invention will be apparent from the following description, reference being had to the accompanying drawing wherein a preferred embodiment of the present invention is clearly shown.

In the drawing:

Fig. 1 is a top plan view showing an electric storage battery equipped with covers embodying the present invention.

Fig. 2 is an enlarged sectional view taken on the line 2—2 of Fig. 1.

Fig. 3 is a sectional view taken on the line 3—3 of Fig. 2.

Fig. 4 is a plan view of a modification of the present invention.

Fig. 5 is a sectional view taken on the line 5—5 of Fig. 4.

Fig. 6 is a sectional view of a cover and showing another modification of the present invention.

Referring to the drawing, 20 designates a storage battery casing or container having partitions 21 which divide the interior of the casing into a plurality of cell compartments. Each compartment is provided with shoulders or ridges 22 formed on the inner side of casing walls, indicated in Fig. 2. The shoulders act as supports for cell top covers 23. The covers are formed with marginal flanges 24 which coact with the walls of the container 20, and also the partitions 21, to provide suitable grooves 25 for receiving a sealing compound 26. The terminal posts 27 and 28, of the battery project through suitable opening in the covers 23.

For interconnecting the cells of the storage battery Fig. 2 illustrates fragments of two ordinary acid storage cells 29 and 30 of which the negative electrode 31 of cell 29 is connected through a lead link or bar 32 to the positive electrode 33 of another cell 30. Each electrode or post 31 and 33 is adapted to extend into a metal bushing 34 so that they will be substantially flush with the top surface of their respective bushings. The bushings 34 are preferably provided with an external tapered portion. The bushings and the electrodes of adjacent cells are connected by one of the lead bars or links 32. These bars are provided with a pair of spaced conical recesses which are adapted to fit over the tapered portions of two adjacent bushings and then fused together by lead burning, or the like.

Referring to Figs. 1 to 3, inclusive, there is shown one form of the present invention which discloses a cap 40 made of a suitable non-conducting material, such as hard rubber or the like. The cap 40 is formed with an elongated recess 41 to provide a peripheral flange 42. Opposite sides of the flange are provided with projections or lugs 43, having outwardly tapered portions 44 which act as anchors for the cap. When the cap 40 is fitted over the link 32 the elongated recess, formed by the peripheral flange, will substantially enclose the link with the lugs extending beyond the link. It will be noted that the lugs 43 extend transversely to the partitions 21 so that when a quantity of pitch or sealing compound 26 is placed within the grooves 25 the tapered portions 44 of the lugs will be embedded in the sealing compound. Thus, the caps are securely held over the links. The top surface of the caps may be provided with longitudinal ridges 48 or any other design as desired.

Figs. 4 and 5 disclose a slight modification of the present invention. This modified construction comprises a cover 50 having a smooth top surface and provided with angular lugs or projections 51. These projections are adapted to be embedded in the sealing compound to hold the cap over the links as set forth for the cover 40.

Fig. 6 shows another modification of the invention. In this instance a cap 60 is provided with an elongated recess 61, similar to that shown in Figs. 1 and 2, to provide a peripheral flange 62. The flange in this instance is preferably a little longer so that the flange may extend a short distance below the top surface of the sealing compound that seals and secures the covers 23 to the casing 20. The top wall of this modified construction is provided with an aperture and the cap is held in position over the bar 34a by a screw 65 which extends through the aperture and into a threaded recess provided by the link.

With the present invention the disclosed constructions not only have utility so as to prevent short circuiting of the cells due to foreign objects falling on the top of the battery, but also the top appearance of the storage battery is enhanced.

While the embodiment of the present invention as herein disclosed, constitutes a preferred form, it is to be understood that other forms might be adopted, all coming within the scope of the claims which follow.

What is claimed is as follows:

1. In combination, a strong battery comprising a plurality of separate cells; a closure for each cell; a plurality of connectors for connecting the cells in series outside the closures; a removable cover of insulating material for enclosing the exposed surfaces of each connector, a quantity of pitch for securing each closure at its respective cell and for sealing the juncture therebetween, said pitch embedding the lower ends of the cover to yieldingly hold the covers over the connectors, said pitch in cooperating with the covers to form a seal, operating to protect the connections from corrosion while in use; and exposed positive and negative terminals separate from the connectors for connecting the battery in an electrical circuit.

2. In combination, a storage battery comprising a plurality of separate cells; a closure for each cell; a plurality of lead connectors for connecting the cells in series outside the closures; a removable cover of non-conducting material having a skirt for enclosing the exposed surfaces of each connector; a quantity of pitch for securing each closure to its respective cell and for sealing the juncture therebetween, said pitch embedding the lower portion of the skirts for protecting the connections from foreign matter causing short circuit and/or corrosion while in use; means having screw threaded engagement with the connectors for holding the covers over the connectors; and exposed positive and negative terminals separate from the connectors for connecting the battery in an electrical circuit.

3. A protector for a storage battery having a plurality of cells comprising; a closure for each cell; pitch means for securing each closure to its respective cell, a connector for connecting two adjacent cells outside the closures; a removable cover of non-conducting material having a recess formed on one side for enclosing the exposed surfaces of the connector; and means associated with the cover for maintaining the cover over the connector and causing the lower extremities of the cover to project into and be concealed by the pitch means whereby the connector is entirely protected from foreign matter while in use.

4. A protector for a storage battery having a plurality of cells, comprising, a closure for each cell; a connector for connecting two adjacent cells in series outside the closures; a removable cover of non-conducting material having a recess to provide a peripheral flange for enclosing the connector and provided with angular portions extending outwardly from the cover; and pitch means for securing the closures to their respective cells and for surrounding the cover to embed the angular portions thereon to retain the cover over the connector and to provide a hermetical seal for the connector while in use.

5. In combination, a storage battery comprising a plurality of cells; a closure for each cell; a plurality of connectors for connecting the cells in series outside the closures; a removable cover of non-conducting material for each connector having a skirt for enclosing the exposed surfaces of the connectors and having angular projections disposed between adjacent cell closures; and a quantity of self-setting composition for securing the closures to their respective cells and for sealing the junctures therebetween, said pitch embedding portions of the skirts and the angular projections to hold yieldably the covers over the connectors and whereby the connectors are completely excluded from foreign matter.

6. In combination, a storage battery comprising a plurality of separate cells; a closure for each cell; posts within the cells and extending through the covers; a connector fixed to posts of adjacent cells for connecting the cells in series; a body of insulating material having a recess for receiving the connector to enclose the exposed surfaces of each connector; means formed integral with the body and extending below the connector, said means having angular portions extending outwardly from the body and disposed between adjacent closures; a quantity of pitch for securing each closure to its respective cell and for sealing the juncture therebetween, said pitch embedding the lower portion of the body and the angular portions for anchoring the bodies, and said pitch in cooperation with the bodies to form a seal about the body operating to protect the connections from corrosion; and an exposed positive and an exposed negative terminal for connecting the battery in an electrical circuit.

7. In combination, a storage battery comprising a plurality of separate cells; a closure for each cell; a plurality of connectors for connecting the cells in series outside the closures; a removable cover of non-conducting material carrying a peripheral flange for enclosing the exposed surfaces of each connector; a quantity of pitch for securing each closure to its respective cell and for sealing the juncture therebetween, said pitch embedding the lower portion of the flange for protecting the connections from foreign matter causing short circuits and/or corrosion while in use; means associated with the cover for maintaining the covers over the connectors; and exposed positive and negative terminals separate from the connectors for connecting the battery in an electrical circuit.

8. In combination, a storage battery comprising a plurality of separate cells; a closure for each cell; a plurality of conducting members for connecting the cells in series above the closures; a removable non-conducting cover for enclosing each conducting member; a quantity of pitch for securing the closures to their respective cells and for sealing the junctures therebetween and co-operating with the covers to provide hermetical seals for the connections; means having screw-thread engagement with the connections for holding the covers against the connections; and exposed positive and negative terminals separate from the connectors for connecting the battery in an electrical circuit.

ROBERT M. CRITCHFIELD.
ARTHUR G. PHELPS.